Patented Apr. 8, 1952

2,592,069

UNITED STATES PATENT OFFICE 2,592,069

FLUOROCARBON VINYL ESTERS AND POLYMERS

Thomas S. Reid, New Canada Township, Ramsey County, Minn., assignor to Minnesota Mining & Manufacturing Company, St. Paul, Minn., a corporation of Delaware No Drawing. Application March 5, 1951, Serial No. 214,025

15 Claims. (Cl. 260—89.1)

This application is a continuation-in-part of my copending application S. N. 74,475, filed on February 3, 1949 (now abandoned.)

This invention relates to my discovery of a new and useful class of reactive fluorocarbon compounds and their polymers.

These new compounds are polymerizable fluorocarbon vinyl esters which contain over 50% by weight of combined fluorine. They can be readily polymerized to yield solid thermoplastic homopolymers containing over 50% by weight of combined fluorine. These polymers are nonflammable and they are insoluble in hydrocarbons and other common organic solvents. They are both hydrophobic and oleophobic. They have refractive index values not exceeding approximately 1.36. Tough and flexible polymers can be made, as well as hard and brittle polymers, depending on the procedures employed.

So far as I am aware these are the first fluorinated high polymers of any kind, made by polymerizing reactive monomers, which melt at moderate temperatures and yet are insoluble in common organic solvents, are nonflammable and contain over 50% by weight of combined fluorine.

These novel fluorocarbon vinyl esters can be made by reacting acetylene with fully fluorinated monocarboxylic acids containing 4 to 18 carbon atoms in the molecule, represented by the formula $R_fCOOH$, where $R_f$ is a saturated polycarbon fluorocarbon group (cyclic or non-cyclic) containing 3 to 17 carbon atoms. The polymerizable monoester product compounds can be generically represented by the class formula:

$$R_fCOOH=CH_2$$

where $R_f$ represents the previously mentioned saturated polycarbon fluorocarbon group which contains 3 to 17 carbon atoms.

These fluorocarbon vinyl esters readily polymerize inter se to form novel fluorocarbon vinyl homopolymers containing a multiplicity of ester units which each have a fluorocarbon side chain ($R_f$) containing from 3 to 17 carbon atoms, as indicated by the following formula which shows two of the recurring ester units:

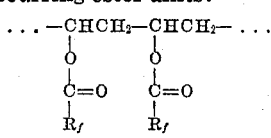

It will be noted that these novel vinyl polymers have a molecular structure comprising a skeletal linear hydrocarbon chain to which a multiplicity of saturated fluorocarbon side chains containing at least three carbon atoms are linked by means of —COO— groups. Homopolymers of mixtures of two or more different fluorocarbon vinyl esters can be made, in which case each polymer molecule will have side chains of different lengths.

Bulk, solution, emulsion and granular polymerization procedures can be utilized. The peroxide catalysts (such as acetyl peroxide, benzoyl peroxide and cumene hydro-peroxide) can be employed, as also boron trifluoride. Use can be made of ultra-violet light for promoting polymerization.

The saturated polycarbon fluorocarbon groups, represented by "$R_f$" in the foregoing formulae, which contain from 3 to 17 carbon atoms, can be of the open chain (non-cyclic) type, normal or branched, and can also be of the closed chain (cyclic) type, and in the latter case the fluorocarbon group can be either a simple ring or a combination of cyclic and non-cyclic sub-groups. The non-cyclic chain groups have the formula: $C_nF_{2n+1}$, and the cyclic groups have the formula: $C_nF_{2n-1}$. The recurring chain unit is the —$CF_2$— group. As previously indicated, these fluorocarbon groups correspond to the carboxyl-bonded hydrocarbon groups of monocarboxylic acids but are fully fluorinated.

An example of these compounds is vinyl n-heptafluorobutyrate:

$$CF_3(CF_2)_2COOCH=CH_2$$

a liquid having a boiling point of about 79° C. It polymerizes inter se to form polyvinyl n-heptafluorobutyrate, wherein the recurring ester units have the formula:

The fully polymerized homopolymers are clear, colorless, water-repellent, thermoplastic solids, which soften at 85–90° C. and melt at 100–105° C. They can be readily shaped and molded when heated. They contain 55% by weight of combined fluorine and are nonflammable (i. e., they do not support combustion). They are both hydrophobic and oleophobic. They are insoluble in hydrocarbons and other common organic solvents such as acetone, butanone, carbon tetrachloride and alcohols. They are soluble in a 1 to 1 mixture of n-heptafluorobutyric acid and methyl isobutyl ketone. They are soluble in the fluorocarbon carboxylic acids and their alkyl esters, and in benzotrifluoride. They soften and swell (without dissolving) in ethyl acetate. They do not appreciably soften or swell upon prolonged contact with hydrocarbons. They have good resistance to hydrolysis both in cold and boiling water. They form clear and colorless films having a refractive index of 1.35, when cast from solutions in the methyl ester of n-heptafluorobutyric acid. These films will be flexible or brittle depending upon the polymerization technique employed (see the illustrations described hereafter in "Example 1").

The properties of other illustrative fluorocarbon vinyl esters and their polymers are given hereafter in the "examples."

In addition to homopolymers of the aforesaid novel vinyl esters, novel copolymers can be made by polymerizing a mixture of these novel vinyl esters and polymerizable monomers of other kinds which contain an ethylenic linkage. Examples of the latter are acrylonitrile, vinyl acetate, styrene, methyl acrylate and methyl methacrylate. The side chains can vary as to length and as to chemical type. This makes possible the production of many different types of polymers having different physical properties.

Polymers can be made which range from soft to horny or hard, and which vary as to flexibility. Rubbery polymers (elastomers) can be made. Clear, transparent, flexible films can be produced. The properties of polymer masses can also be varied by the use of plasticizers, and by compounding with carbon black and other finely divided solid materials such as zinc oxide. The stiffness or hardness of the polymer mass can be increased by including a small proportion of a polyfunctional polymerizable compound at the time of polymerization to cause cross-linking between the skeletal chains and thereby form a three-dimensional network. The use of these various expedients for modifying the properties of polymer masses is understood by those skilled in polymer chemistry and need not be elaborated upon.

The fundamental contribution of the present invention is the discovery of the aforesaid novel fluorocarbon vinyl ester compounds and of their utility as polymerizable monomers for making a wide variety of homopolymers and of heteropolymers.

As previously pointed out, the use of my novel fluorocarbon vinyl esters provides the vinyl polymer structure with saturated fluorocarbon terminal side chains containing at least three carbon atoms. This type of side chain imparts novel properties due to its unique combination of physical and chemical properties. These fluorocarbon chains are nonflammable and they have a high degree of thermal stability and chemical inertness. They do not have an affinity for either water or hydrocarbons (i. e., they are both hydrophobic and oleophobic). These fluorocarbon chains impart a predominantly fluorocarbon character to the vinyl ester and yet the latter remains reactive and polymerizable. The presence of over 50% by weight of combined fluorine renders the homopolymers completely nonflammable. They have excellent electrical properties and are suitable as insulators in radio-frequency equipment. Their refractive indices and dielectric constants are extremely low. They have exceptionally good resistance to absorption of water, hydrocarbon solvents and fuels, oils and greases, and are repellent to water. These general properties of the polymers are still further enhanced by increase in the fluorocarbon chain length.

A striking illustration of the effect of fluorocarbon chain length is provided by a simple demonstration experiment. To a flask containing toluene add 1% of n-heptafluorobutyric acid, $CF_3(CF_2)_2COOH$, and shake. The toluene no longer wets the glass surface as it did initially, the angle of contact being changed from zero to almost 90°. This is because the n-heptafluorobutyric acid molecules are adsorbed by the glass and form an interfacial film which the toluene does not wet. Trifluoroacetic acid, $CF_3COOH$, does not have this property and in fact tends to destroy the anti-wetting characteristic of the n-heptafluorobutyric acid when present with it. This demonstrates that a single fully fluorinated carbon atom (i. e. a trifluoromethyl group) bonded to a functional group differs in kind from a fully fluorinated polycarbon chain bonded to the same functional group. And in keeping with this distinction between a fluorocarbon chain and a fluorinated single carbon atom, it is found that the vinyl esters of the present invention form polymers having distinctly different properties as compared to polymers formed from the vinyl trifluoroacetate ester. The polyvinyl trifluoroacetate homopolymer contains less than 50% fluorine (41%) and it is soluble in common organic solvents such as acetone, cyclohexanone and butyl acetate (cf. U. S. Patent No. 2,436,144 of February 17, 1948).

The homopolymers of the present vinyl esters, which contain a fluorocarbon chain, differ markedly from those which can be made from vinyl ester analogues wherein the corresponding carbon atoms of the chain are not fully fluorinated. The present polymers are not subject to dehydrofluorination when heated to elevated temperatures, since they do not contain fluorine and hydrogen on adjacent carbon atoms.

The fluorocarbon vinyl esters of the present invention can be made by passing acetylene through the appropriate fluorocarbon acid at room temperature or moderately elevated temperatures, in the presence of a suitable catalyst. The higher acids which are solid at room temperature can be reacted at elevated temperatures at which they are liquid, or in solution in a suitable solvent.

The following are illustrative fluorocarbon acids which can be employed for making the corresponding vinyl esters (listed with approximate boiling points at 740 mm.):

| | B. P. (° C.) |
|---|---|
| $CF_3(CF_2)_2COOH$, heptafluorobutyric acid | 120 |
| $(CF_3)_2CFCOOH$, iso-heptafluorobutyric acid | 117.5 |
| $CF_3(CF_2)_3COOH$, nonafluorovaleric acid | 139 |
| $(CF_3)_2CFCF_2COOH$, iso-nonafluorovaleric acid | 137 |
| $CF_3(CF_2)_4COOH$, undecafluorocaproic acid | 157 |
| $CF_3(CF_2)_6COOH$, pentadecafluorocaprylic acid | 189 |
| $CF_3(CF_2)_8COOH$, nonadecafluorocapric acid | 218 |
| $CF_3(CF_2)_{10}COOH$, tricosafluorolauric acid | 245 |
| $CF_3(CF_2)_{12}COOH$, heptacosafluoromyristic acid | 270 |
| $CF_3(CF_2)_{14}COOH$, hentriacontafluoropalmitic acid | 294 |
| $CF_3(CF_2)_{16}COOH$, pentatricontafluorostearic acid | 316 |
| $C_6F_{11}COOH$, undecafluorocyclohexane carboxylic acid | 170 |
| $C_6F_{11}CF_2COOH$, tridecafluorocyclohexane acetic acid | 184 |

The first five acids in the above listing are liquid at room temperature; the higher members of the fully fluorinated saturated fatty acid series being solid at room temperature. The cyclic $C_6F_{11}COOH$ acid is solid at room temperature but the $C_6F_{11}CF_2COOH$ acid is liquid.

These fully fluorinated acids are extremely strong, the acid strength of aqueous solutions being of the same order of magnitude as that of strong mineral acids, whereas the corresponding hydrocarbon acids are relatively weak. They can be made by hydrolyzing the corresponding acid fluorides ($R_fCOF$), which are highly reactive and readily react with water to form the carboxylic acid derivatives. The acid fluorides can be made by electrolyzing a solution of anhydrous liquid hydrogen fluoride containing a dissolved hydrocarbon monocarboxylic acid (or its anhydride) of corresponding carbon skeletal structure, by passing direct current through the solution at a cell voltage which is insufficient to generate molecular (free elemental) fluorine under the existing conditions, but which is sufficient to cause the formation of the fully fluorinated acid derivative ($R_fCOF$) at a useful rate. Aromatic acid starting compounds can be utilized and saturation will be produced by fluorine addition.

Excellent results can be obtained with simple single compartment electrolytic cell arrangements. No diaphragm is needed between electrodes. The cell can be readily operated at atmospheric pressure, employing a cell temperature in the neighborhood of 0° C. The cell and the cathodes can be made of iron or steel, and the anodes of nickel, and such cells have been satisfactorily operated at approximately 5 to 6 volts, D. C. The fluorocarbon acid fluoride product of the cell operation is relatively insoluble in the electrolyte solution and either settles to the bottom of the cell from which it can be drained with other fluorocarbon products of the process, or is volatilized and evolves from the cell in admixture with the hydrogen and other gaseous products. The fluorocarbon acid fluoride compound can be hydrolyzed to the fluorocarbon acid derivative ($R_fCOOH$) while still mixed with other products and the acid product can be separated and recovered. Another procedure is to react the acid fluoride with ammonia to produce the amide ($R_fCONH_2$), a solid compound which can be readily separated and purified, and then hydrolyze the latter to produce the fluorocarbon acid ($R_fCOOH$).

The electrochemical process is described and broadly claimed in the patent of J. H. Simons No. 2,519,983 (August 22, 1950). Fluorocarbon acids containing four or more carbon atoms are described and claimed in the copending application of A. H. Diesslin, E. A. Kauck, and J. H. Simons, S. N. 70,154, filed January 10, 1949, now Patent No. 2,567,011, which also describes the electrochemical process.

Returning to the preparation of the fluorocarbon vinyl esters of the present invention, by reacting acetylene with the corresponding fluorocarbon acids, it has been found that this reaction requires the use of a suitable catalyst in order to obtain useful yields of the desired polymerizable monoester monomers; avoiding premature polymerization thereof and also avoiding having the reaction go in the direction of primarily forming non-polymerizable diester compounds resulting from the addition of two molecules of fluorocarbon acid to acetylene, such diesters having the formula: $(R_fCOO)_2CHCH_3$.

I have discovered that the desired polymerizable ester monomers can be readily produced in good yield by conducting the reaction in the presence of a catalyst formed from acetylene disulfonic disulfuric acid and the mercuric salt of the fluorocarbon acid employed in making the ester. A reaction temperature of about 35° C. is suitable but higher and lower temperatures can be used. The desired ester product can be separated from the reaction mixture by vacuum distillation. A polymerization inhibitor can be added to prevent polymerization on long standing, but ordinarily is not needed. The mercuric salt is formed by reacting mercury (conveniently in the form of mercuric oxide) with a portion of the same fluorocarbon acid that is employed for making the desired vinyl ester. Thus in making the vinyl heptafluorobutyrate ester, the mercuric salt employed would be mercuric heptafluorobutyrate. The acetylene disulfonic disulfuric acid is formed by reacting acetylene and fuming sulfuric acid. A method of making such catalysts will be illustrated in the subsequent "Example 1."

I have subsequently discovered that good results can be obtained by using phosphorous pentoxide in conjunction with the mercuric salt mentioned above, the disulfonic disulfuric acid being unnecessary in this case. The phosphorous pentoxide is added in small amount to the starting mixture of fluorocarbon acid and mercuric salt and mixed, the amount being sufficient to form a white suspension which serves as an indicator. I have also discovered that the anhydride of the fluorocarbon acid (for instance heptafluorobutyric anhydride) can be used for this purpose in small amount. Possibly the explanation is that these agents insure a rigorously anhydrous solution (removing the slight amount of water produced by the reaction of the fluorocarbon acid and the mercuric oxide) and under these conditions the mercuric salt effectively serves as a catalyst even in the absence of the acetylene disulfonic disulfuric acid.

As previously mentioned, the lower fluorocarbon acids are liquid at room temperature and the acetylene can be readily introduced into the reaction solution. Higher acids which are solid at room temperature can be heated to above the melting point to provide a liquid reaction mixture, or can be dissolved in an inert solvent, or can be dissolved in a lower acid which is normally liquid (in which case a mixture of esters will be obtained which can be separated by fractional distillation).

*Example 1*

This example provides a detailed illustration of the general procedures previously described and relates specifically to the production of the vinyl n-heptafluorobutyrate ester,

and homopolymers and copolymers made therefrom. It will also serve as a guide to the making of other esters and polymers of the present invention.

The reaction vessel was a 3-necked spherical glass flask fitted with a glass-bearing stirrer, thermometer, water-cooled reflux condenser, gas distributor inlet for acetylene, and provided with a heating mantle.

The flask was charged with 79.4 grams of n-heptofluorobutyric acid, $CF_3(CF_2)_2COOH$. The catalyst was provided by adding 1.2 grams of red mercuric oxide which reacted with the acid to form mercuric heptofluorobutyrate, and then adding 2.5 grams of acetylene disulfonic disulfuric acid while vigorously stirring the mixture. This resulted in the formation of a white suspensoid imparting a cloudy appearance. The acetylene acid was previously prepared in another vessel by running purified acetylene into well-stirred fuming sulfuric acid (89% total SO₃) for 6½ hours at 35° C. The acetylene from the supply tank was purified by passing through water, solid calcium chloride, and solid sodium hydroxide. This acetylene acid is termed acetylene disulfonic disulfuric acid but presumably is a mixture containing other acetylene acids as well.

Purified acetylene was run into the aforesaid fluorocarbon acid and catalyst reaction mixture for 6½ hours while maintaining a temperature of 35° C. At the beginning of the reaction the flask was cooled occasionally, but heat was supplied during the latter part of the run to maintain the desired temperature. The reaction mixture gradually turned black as the acetylene was introduced.

At the end of the run the mixture was cooled to 0° C. and allowed to stand over night at this temperature. It was then vacuum-distilled and the distillate was collected in a receiver cooled by a mixture of solid CO₂ and acetone. The distillate was redistilled at atmospheric pressure through a 11-inch column packed with glass helices, yielding 46.1 grams of a product boiling at 78–79° C. at 748 mm. This was identified as relatively pure vinyl n-heptafluorobutyrate,

CF₃(CF₂)₂COOCH=CH₂ having the following measured properties:

Boiling point (at 748 mm.) _____° C__ 78–79
Density (grams/cc. at 20° C.) _____ 1.418
Surface tension (dynes/cm. at 20° C.) _____ 17.5
Refractive index (at 20° C.) _____ 1.309
Molar refractivity (found) _____ 32.3
Molar refractivity (calc.) _____ 31.7

Analysis for fluorine gave a value of 52.3% as compared to 55.4% calculated for the pure compound. Infra-red absorption spectra showed the presence of unsaturation, a carbonyl group, and carbon-fluorine and carbon-hydrogen bonds.

The polymerization characteristic of this product was demonstrated by heating in a closed container in an oxygen-free atmosphere, and in the presence of 0.1% of dissolved benzoyl peroxide polymerization catalyst, for a period of 16 hours at 65–67° C. This resulted in a clear solid polymer which was slightly flexible.

In a further experiment 2.0 grams of vinyl n-heptafluorobutyrate and 0.08 gram of a 25% solution of acetyl peroxide in dimethyl phthalate were sealed in an air-free glass ampoule and shaken at 45° C. for 16 hours. There was obtained a clear, colorless, flexible polymer having a refractive index of 1.35. A solution of 0.25 grams of the polymer in 100 ml. of methyl n-heptafluorobutyrate had an intrinsic viscosity of 0.48 at 26° C. Tough, flexible, clear and colorless, transparent films were cast from solutions of this polymer in methyl n-heptafluorobutyrate solvent.

In another experiment vinyl n-heptafluorobutyrate was polymerized (without added catalyst) by merely being heated at the boiling point in a still pot for three days. There was obtained a clear homopolymer mass which, at room temperature, was very tough and flexible, and which could be pulled out and showed limited elastic regain. Stretching caused orientation of the polymer molecules. A solution of 0.25 gram of this polymer in 100 ml. of methyl n-heptafluorobutyrate had an intrinsic viscosity of 1.12 at 26° C.

Solution polymerization is illustrated by the following data:

A 250 ml. glass flask equipped with stirrer, reflux condenser, thermometer, and gas and liquid inlets, was swept with dry oxygen-free nitrogen for 20 minutes. Then 50 grams of vinyl n-heptafluorobutyrate was charged to the flask followed by a mixture of 50 grams of methyl n-heptafluorobutyrate (inert solvent) and 2.5 grams of a 25% solution of acetyl peroxide (catalyst) in dimethyl phthalate. This charge was heated gradually to 60° C. with stirring over a period of about one hour. Polymerization at this point caused the temperature of the solution to rise quickly to 70° C. after which it fell again to 60° C. Nitrogen flow was maintained through the flask to prevent the entry of oxygen. The solution was stirred for 8 hours after the initial signs of reaction in order to secure high conversion. The reactor was then cooled whereupon the solution formed a gel. The polymer was recovered by evaporating off the solvent and in this case formed clear, colorless, somewhat brittle films. It had a refractive index of 1.35, softened at 90° C. and melted at 105° C. A solution of 0.25 gram in 100 ml. of methyl n-heptafluorobutyrate had an intrinsic viscosity of 0.30 at 26° C.

In another experiment, 1.0 gram of vinyl n-heptafluorobutyrate, 3.0 grams of benzotrifluoride (solvent), and 0.1 gram of a 25% solution of acetyl peroxide in dimethyl phthalate, were sealed in an air-free glass ampoule and shaken for 16 hours at 50° C. The solution gelled on cooling. This gel was broken by shaking with an equal volume of benzotrifluoride. The polymer was recovered by pouring this solution into methanol, filtering the precipitate, and drying. The product was a friable white solid. Clear, colorless, brittle films having a refractive index of 1.35 were cast from solutions of this polymer in methyl n-heptafluorobutyrate solvent.

Suspension polymerization is illustrated by the following data:

A 500 ml. 3-necked round-bottom flask equipped with a mercury-sealed stirrer, reflux condenser, thermometer, and gas and liquid inlets, was flushed with dry oxygen-free nitrogen and then charged with 200 ml. of an aqueous solution containing 111.6 grams of calcium chloride. Two grams of magnesium carbonate was added and the mixture was stirred while being warmed to 60° C. Then 72.3 grams of vinyl n-heptafluorobutyrate, saturated at room temperature with benzoyl peroxide, was added rapidly to the flask, and moderate stirring was continued for six hours while a reaction temperature of 60–65° C. was maintained. The flask was cooled and magnesium carbonate was removed by adding dilute HCl to the mixture. Fine beads (0.1–0.5 mm. dia.) of the polyvinyl n-heptafluorobutyrate polymer were recovered, washed and dried. They were clear, colorless, flexible and tough, and had a refractive index of 1.35.

The following illustrations exemplify the making of copolymers:

Acrylonitrile (0.5 g.), vinyl n-heptafluorobutyrate (2.25 g.), and 0.04 gram of a 25% solution of acetyl peroxide in dimethyl phthalate, were shaken in an air-free glass ampoule for 20 hours at 55° C. There was obtained 0.71 gram of a light yellow powder containing 14.5% fluorine, corresponding to 26.2% copolymerized vinyl n-heptafluorobutyrate.

Vinyl acetate (0.5 g.), vinyl n-heptafluorobutyrate (1.4 g.), and 0.04 gram of a 25% solution of acetyl peroxide in dimethyl phthalate, were shaken in an air-free glass ampoule for 20 hours at 55° C. The product was 1.29 grams of a clear, colorless, flexible polymer which was soluble in acetone. The polymer contained 35.1% fluorine, corresponding to 63.5% copolymerized vinyl n-heptafluorobutyrate.

Styrene (0.5 gram), vinyl n-heptafluorobutyrate (1.65 g.), and 0.04 gram of a 25% solution of acetyl peroxide in dimethyl phthalate, were shaken in an air-free glass ampoule for 20 hours at 55° C. A yellow, opaque, hard solid (0.80 g.) was obtained. Thin films cast from solutions in benzene were yellow, translucent and flexible. This polymer contained 30.8% fluorine, corresponding to 55.7% copolymerized vinyl n-heptafluorobutyrate.

Methyl methacrylate (0.5 g.), vinyl n-heptafluorobutyrate (1.20 g.), and 0.04 gram of a 25% solution of acetyl peroxide in dimethyl phthalate were shaken in an air-free glass ampoule for 20 hours at 55° C. A hard, white, translucent polymer (1.70 g.) was obtained. This polymer contained 30.0% fluorine corresponding to 54.2% copolymerized vinyl n-heptafluorobutyrate.

*Example 2*

This example illustrates the use of phosphorous pentoxide (no use being made of acetylene disulfonic disulfuric acid), and the making of vinyl n-nonafluorovalerate, $$CF_3(CF_2)_3COOCH=CH_2$$

and its homopolymer.

The reaction vessel was a 3-necked glass flask equipped with a gas inlet tube, mechanical stirrer, electrical heating mantle, and a water-cooled condenser which was connected to a trap cooled by a mixture of acetone and solid-$CO_2$.

The flask was charged with 60 grams of n-nonafluorovaleric acid, $CF_3(CF_2)_3COOH$, and 1.3 grams of red mercuric oxide. The mixture was stirred and heated until complete solution occurred. Then 0.7 gram of phosphorous pentoxide was added to the well-stirred mixture, giving a white suspension which indicated an anhydrous condition. The heating mantle was replaced by a water bath maintained at 30° C. Acetylene from a tank (purified by passage through water, solid calcium chloride and solid sodium hydroxide) was introduced at a rate such that complete absorption took place. Several times during the reaction it was found necessary to decrease the rate of acetylene addition owing to the decrease in the absorption rate. At the end of six hours the acetylene was shut off. A small amount of material was caught in the trap and this was added to the mixure in the flask, which was stored overnight at 0° C.

Distillation of this mixture in an 8-inch packed column gave 49.3 grams of the crude vinyl ester product. The latter was refractionated through an 11-inch "Heli-Pak" packed column, yielding 48.3 grams (73.3%) of vinyl n-nonafluorovalerate. This had a boiling point of 97-99° C. (at 732 mm.), a density of 1.493 (grams/cc. at 20° C.), and a refractive index of 1.3116 (at 20° C.).

This ester was found to be readily polymerizable in bulk or solution, using a trace of peroxide catalyst and heating to a moderate temperature. The polymer (polyvinyl n-nonafluorovalerate) has a refractive index of 1.35–1.36 and softens at between 80 and 90° C. In films this polymer is clear, colorless and brittle. Its solubility characteristics are similar to that of the previously described polyvinyl n-heptafluorobutyrate polymer. A 0.25% solution in the methyl ester of n-heptafluorobutyric acid has an intrinsic viscosity of 0.24.

*Example 3*

This example illustrates the preparation of vinyl n-undecafluorocaproate, $$CF_3(CF_2)_4COOH=CH_2$$

from n-undecafluorocaproic acid, $$CF_3(CF_2)_4COOH$$

The procedure was the same as in the preceding example except that a temperature of 10-20° C. was used. Use was made of 36.3 grams of the fluorocarbon acid, 1 gram of red mercuric oxide and 1 gram of phosphorus pentoxide. Refractionation of the crude ester product gave 17.4 grams (44.3%) of purified ester, which had a boiling point of 100° C. (at 100 mm.), a density (20° C.) of 1.546 and a refractive index (20° C.) of 1.3115.

The polymer (polyvinyl n-undecafluorocaproate) has a refractive index of 1.36. It softens at 80° C. and melts at 100° C. Films are clear, colorless and brittle. It has solubility characteristics like the lower members of the series, previously mentioned. A 0.25% solution in the methyl ester of n-heptafluorobutyric acid has an intrinsic viscosity of 0.25.

*Example 4*

This example illustrates the making of the esters from higher fluorocarbon acids which are solid at room temperature. The procedure was the same as in Example 2 except that a reaction temperature of 80° C. was employed for a period of five hours, thereby maintaining the acid in a liquid state. Use was made of 30 grams of n-nonadecafluorocapric acid, $CF_3(CF_2)_8COOH$, 2.5 grams of red mercuric oxide and 0.25 gram of phosphorous pentoxide. The refractionated ester product, vinyl n-nonadecafluorocaprate, $$CF_3(CF_2)_8COOCH=CH_2$$

was obtained in a yield of 11.9 grams (38%). It had an oily consistency, a vacuum boiling point of 53° C. (at 0.5 mm.), a density (20° C.) of 1.707 and a refractive index (20° C.) of 1.3176.

The polymer (polyvinyl n-nonadecafluorocaprate) is a clear, colorless, thermoplastic solid that is somewhat waxy in nature, having a refractive index of 1.35. It is not soluble in common organic solvents, but it does dissolve in the methyl ester of heptafluorobutyric acid. The polymer is readily formed as shown by the following experiments:

One gram of the vinyl ester monomer and 0.02 gram of acetyl peroxide were sealed in an oxygen-free glass ampoule which was shaken at 45° C. for 24 hours, resulting in the aforesaid polymer. In another experiment, 1 gram of the monomer, 1 gram of methyl heptafluorobutyrate, and 0.02 gram of acetyl peroxide were charged to a glass ampoule, the air was evacuated, and it was sealed. It was shaken at 45° C. for 48 hours. The resulting solution of polymer in solvent was poured into cold, absolute methanol, thereby precipitating the polymer.

Example 5

This example illustrates the making of an ester from a cyclic fluorocarbon acid having the carboxyl group bonded to a cyclic carbon atom. The procedure was the same as in Example 2 except that a reaction temperature of 50° C. was used for a period of 2½ hours. Use was made of 30 grams of undecafluorocyclohexane carboxylic acid, $C_6F_{11}COOH$, 1 gram of red mercuric oxide and 1.5 grams of phosphorous pentoxide. The refractionated ester product, vinyl undecafluorocyclohexane carboxylate, $$C_6F_{11}COOCH=CH_2$$

was obtained in a yield of 17.9 grams (55.6%). It had a vacuum boiling point of 59–59.5° C. (at 45 mm.), a density (20° C.) of 1.628 and a refractive index (20° C.) of 1.3362.

This ester polymerizes to form a hard, clear, colorless polymer having a refractive index of 1.36, which softens at 90° C. and melts at 115° C. The solubility characteristics are similar to those of the previously mentioned polymers.

Having described various embodiments of the invention, for purposes of illustration rather than limitation, what I claim is as follows:

1. Polymerizable fluorocarbon vinyl esters having the formula:

$$R_fCOOCH=CH_2$$

where $R_f$ is a saturated fluorocarbon group containing 3 to 17 carbon atoms.

2. Polymerizable fluorocarbon vinyl esters having the formula:

$$C_nF_{2n+1}COOCH=CH_2$$

where $n$ is an integer having a value of 3 to 17.

3. Polymerizable fluorocarbon vinyl esters having the formula:

$$C_nF_{2n-1}COOCH=CH_2$$

where the fluorocarbon group contains a fully fluorinated cyclohexyl ring, and $n$ is an integer having a value in the range of 3 to 17.

4. The vinyl heptafluorobutyrate ester having the formula:

$$CF_3(CF_2)_2COOCH=CH_2$$

5. The vinyl nonafluorovalerate ester having the formula:

$$CF_3(CF_2)_3COOCH=CH_2$$

6. The vinyl undecafluorocaproate ester having the formula:

$$CF_3(CF_2)_4COOCH=CH_2$$

7. The vinyl nonadecafluorocaprate ester having the formula:

$$CF_3(CF_2)_8COOCH=CH_2$$

8. The vinyl undecafluorocyclohexane carboxylate ester having the formula:

$$C_6F_{11}COOCH=CH_2$$

9. The method of making polymerizable fluorocarbon vinyl esters which comprises reacting acetylene and a fully fluorinated monocarboxylic acid containing 4 to 18 carbon atoms in the molecule, in the presence of a mercuric salt of said acid, and recovering a vinyl ester having the formula:

$$R_fCOOCH=CH_2$$

where $R_f$ is the saturated fluorocarbon group from the starting acid.

10. Polymers formed by polymerizing fluorocarbon vinyl ester monomers having the formula:

$$R_fCOOCH=CH_2$$

where $R_f$ is a saturated fluorocarbon radical containing 3 to 17 carbon atoms; these polymers having a skeletal chain containing fluorocarbon ester units indicated by the formula:

$$\begin{array}{c}-CHCH_2-\\|\\O\\|\\C=O\\|\\R_f\end{array}$$

11. A fluorocarbon vinyl ester homopolymer formed by polymerizing the vinyl heptafluorobutyrate ester having the formula:

$$CF_3(CF_2)_2COOCH=CH_2$$

12. A fluorocarbon vinyl ester homopolymer formed by polymerizing the vinyl nonafluorovalerate ester having the formula:

$$CF_3(CF_2)_3COOCH=CH_2$$

13. A fluorocarbon vinyl ester homopolymer formed by polymerizing the vinyl undecafluorocaproate ester having the formula:

$$CF_3(CF_2)_4COOCH=CH_2$$

14. A fluorocarbon vinyl ester homopolymer formed by polymerizing the vinyl nonadecafluorocaprate ester having the formula:

$$CF_3(CF_2)_8COOCH=CH_2$$

15. A fluorocarbon vinyl ester homopolymer formed by polymerizing the vinyl undecafluorocyclohexane carboxylate ester having the formula:

$$C_6F_{11}COOCH=CH_2$$

THOMAS S. REID.

REFERENCES CITED

The following references are of record in the file of this patent:

UNITED STATES PATENTS

| Number | Name | Date |
|---|---|---|
| 2,239,763 | Toussaint | Apr. 29, 1941 |
| 2,269,187 | D'Alelio | Jan. 6, 1942 |
| 2,436,144 | Howk et al. | Feb. 17, 1948 |
| 2,443,005 | Jacobson | June 8, 1948 |

OTHER REFERENCES

Industrial & Engineering Chem., vol. 39, No. 3, March 1947, p. 242.